May 27, 1958 G. R. RYAN 2,836,179
CLOSURE CONNECTING MEANS
Filed Jan. 10, 1955
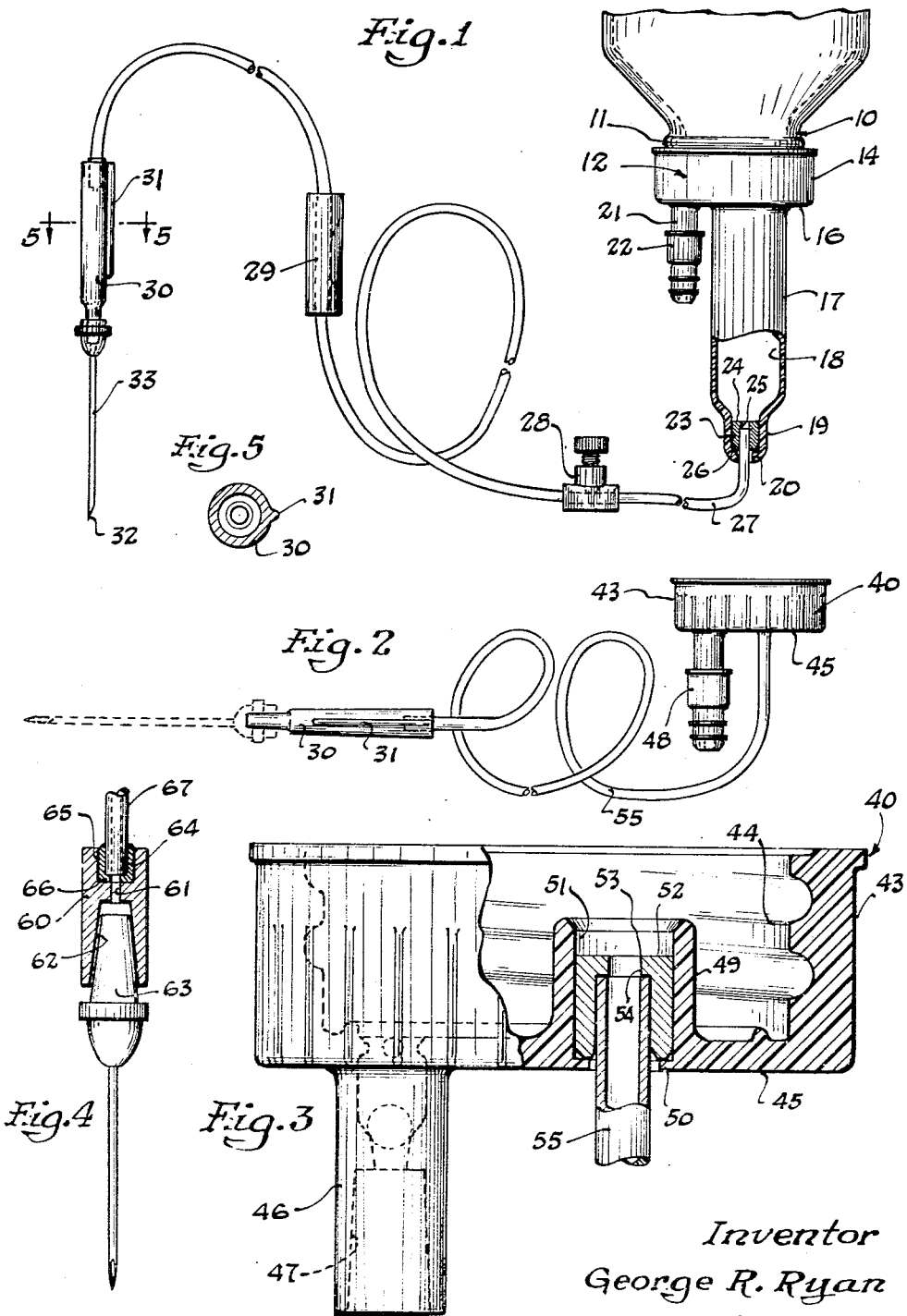
Inventor
George R. Ryan
By William E. Dominick
Attorney United States Patent Office 2,836,179
Patented May 27, 1958

2,836,179

CLOSURE CONNECTING MEANS

George R. Ryan, Waukegan, Ill., assignor to Abbott Laboratories, North Chicago, Ill., a corporation of Illinois Application January 10, 1955, Serial No. 480,663

3 Claims. (Cl. 128—214)

This invention relates to improved medical apparatus for the administration of parenteral liquids and more particularly to medical apparatus having improved means of attaching a length of plastic tubing to said apparatus.

In the manufacture of disposable venoclysis equipment used in administering parenteral fluids, it is frequently desirable to form a fluid-tight connection between a length of flexible tubing and the apparatus with which it is connected, such as a drip chamber, a closure cap, or a hypodermic needle adapter. The closure cap, for example, is of necessity frequently made of a plastic composition to which the flexible tubing cannot be heat or solvent sealed so as to form a permanently fluid-tight connection. Thus, when the flexible tubing is made of an elastomeric vinyl chloride polymer and the closure cap of a fluid container, a drip chamber, or other medical apparatus, is made of a phenol-formaldehyde resin, a hard rubber composition, glass, or metal, it is not possible to join the said tubing and cap by means of a heat or solvent seal into a unitary fluid-tight structure. Moreover, it is not satisfactory to insert the tubing over a projection extending from the medical apparatus, since the tubing, in time, exhibits plastic cold flow and does not remain permanently in fluid-tight relationship with the said projection.

It is, therefore, an object of the present invention to provide an improved fluid-tight connection between a plastic tubing component and a medical apparatus member to which the tubing component cannot normally be permanently connected in a fluid-tight relationship.

It is another object of the present invention to provide an improved medical apparatus with which a fluid-tight connection can be more readily and conveniently made between a flexible plastic tubing and the said apparatus.

It is still another object of the invention to provide disposable plastic venoclysis equipment which is less expensive to manufacture.

Other objects of the invention will be apparent from the detailed description and claims to follow.

The foregoing objects and other advantages of the present invention will be readily appreciated by reference to the following detailed description when considered in conjunction with the accompanying drawing showing the embodiment of the invention wherein:

Figure 1 is a fragmentary side elevation view partially in vertical section showing a drip chamber assembly embodying the present invention;

Figure 2 is a side elevation view showing a closure cap assembly for a parenteral fluid container;

Figure 3 is a side elevation view partially in vertical section showing the closure cap of Figure 2;

Figure 4 is a vertical sectional view of a hypodermic needle adapter assembly embodying the present invention; and Figure 5 is a vertical sectional view of a hypodermic needle adapter along the line 5—5 of Figure 1.

In the embodiment of the invention shown in Figure 1 of the drawing, the outlet neck 10 of a parenteral fluid container is shown in an inverted position having suitable external screw threads 11 disposed thereon with which the unitary closure cap and drip chamber 12 is threadably engaged. The said unitary closure cap and drip chamber 12 is preferably formed of a flexible resilient plastic material, such as polyethylene plastic, and comprises a body section 14 having screw threads on the inner surface thereof adapted to engage with the external threads 11 of the container. The end wall 16 of the body section 14 has extending downwardly therefrom an elongated cylindrical wall section 17 forming a drip chamber 18 which is closed at the lower end by a reduced diameter section 19 having an inwardly extending retaining flange 20 at the lower end providing an outlet passage suitable for receiving the end of a length of plastic tubing. The end wall 16 spaced laterally of the cylindrical wall section 17 is also provided with an outwardly extending small diameter tubular projection 21 which is provided with a valve means intermediate the ends thereof suitable for controlling the inflow of air and preventing the outflow of parenteral fluid therethrough. The end of projection 21 is also provided with a dust cap 22 which serves as an air filter.

Disposed in the reduced diameter section 19 at the lower end of the drip chamber 18 is a plastic ring 23 having at its upper end an inwardly extending flange 24 which forms a restricted axial passage 25. The inwardly extending flange 24 also provides on the inner surface of the ring 23 a shoulder against which the end of the length of plastic tubing 27 abuts. The ring 23 has an external diameter such that when the ring 23 is inserted into the reduced diameter section 19 with the larger diameter end 26 extending outwardly, the ring 23 frictionally engages the inner walls of the reduced diameter section 19 and is securely held therein.

The tubing 27 has disposed thereon a screw clamp 28 for controlling the flow of fluid therethrough and has intermediate the ends thereof a penetrable tubing connector 29 through which a hypodermic needle can be inserted into the interior thereof to introduce a medicament into the fluid flowing therethrough. The outer end of the plastic tubing 27 is inserted in a hypodermic needle adapter 30 which has a rib section 31 integrally formed on the outer surface thereof which serves as a marker and guide for positioning the bevel 32 of the hypodermic needle 33 mounted thereon.

Figure 2 shows a modified form of the invention which comprises a closure cap 40 for a parenteral fluid container which has a cylindrical body section 43 having a screw threaded section 44 on the inner surface thereof and having extending outwardly from the lower surface 45 thereof a tubular section 46 having intermediate the ends thereof an air valve means suitable for controlling the inflow of air therethrough and preventing the outflow of parenteral fluid. The outer end of section 46 is preferably provided on the inner surface thereof with an inwardly tapering surface 47 suitable for receiving an adapter provided with a Luer taper. In the absence of an adapter, a filter cap 48 is mounted on the projection 46.

The lower surface 45 is also provided with an upwardly extending cylindrical section 49 spaced inwardly from the lateral wall 43 and having a reduced diameter section 50 at the lower end thereof suitable for receiving the end of a length of plastic tubing. Inserted into the large diameter end 51 of the section 49 is a ring member 52 having a diameter such that it is frictionally engaged by the inner wall of section 49 and held therein. The ring member 52 has an inwardly extending flange 53 at the upper end thereof providing a shoulder 54 against which the end of a length of tubing 55 abuts.

Figure 4 illustrates a still further embodiment of the present invention which comprises a hypodermic needle hub adapter 60 having a longitudinal axial passage 61 extending therethrough. The outer end of the longitudinal passage 61 is enlarged and provided with inwardly tapered walls 62 formed to receive a standard male Luer tapered hypodermic needle hub 63. The inner end of the longitudinal passage 61 is enlarged to form a cylindrical opening 64 into which is inserted a plastic ring member 65 which is provided with an inwardly extending flange 66 at the outer end thereof forming on the inner surface a shoulder section against which the end of a length of flexible tubing 67 abuts.

In Figures 1, 3, and 4, the ring members 24, 52, and 65, respectively, are in each instance formed of a material which can be permanently sealed by way of a solvent or heat sealing treatment with the length of flexible tubing so as to form a permanent fluid-tight bond therebetween. In the preferred form of the invention, the ring member is formed of a hard polyvinyl plastic material to which the polyvinyl plastic flexible tubing can be readily sealed by moistening the end of the tubing with a solvent, such as benzyl alcohol, and inserting the end of the tubing into the interior of the said ring which is seated in the venoclysis apparatus until the end of the tubing abuts the inwardly extending flange of the ring member. As the ring member is frictionally held in fluid-tight engagement by the walls of the medical apparatus in which it is placed, there is no necessity of otherwise securing the ring in position, particularly in the apparatus shown in Figures 1, 2, and 3 of the drawing, since normally the only force applied against the ring is an outwardly longitudinal force and the inwardly projecting flange of the reduced diameter section of the apparatus restrains and prevents the movement outwardly of the said ring. In the form of the invention shown in Figure 4, however, it may be considered advisable to provide the ring member 65 with means for securing the ring in engagement with the walls of the adapter 60, such as providing an enlarged section or retaining ring on the outer surface of the ring 65.

When the flexible tubing is made of a plastic material other than polyvinyl plastic, it may, of course, be necessary to make the ring members 24, 52, and 65, respectively, of a plastic material other than polyvinyl plastic with which the molecules of the plastic tubing form an integral bond after being moistened with a solvent for the said plastic tubing and placed in contiguous relationship or upon the application of heat to the contiguous plastic ring and plastic tubing.

It should also be understood that the medical apparatus carrying the plastic ring member to which the tubing is sealed can be made of any suitable plastic material, metal, rubber composition, or glass. Also, the plastic tubing, which in the preferred embodiment is flexible, can also consist of a length of rigid tubing.

Others may readily adapt the invention for use under various conditions of service, by employing one or more of the novel features diclosed or equivalents thereof. As at present advised with respect to the apparent scope of my invention, I desire to claim the following subject matter.

I claim.

1. An article of manufacture comprising in combination, a main body section with an end wall adapted for detachably engaging with the discharge outlet of a fluid container, said body section having a lower end section apertured to provide a fluid outlet passage adapted to receive the end of a small diameter flexible plastic tubing, said apertured portion of the body section having disposed therein a plastic ring member the outer walls of which form a fluid-tight engagement with the said body section, said ring member being formed of a plastic material which is sealable with the surface of a length of flexible plastic tubing, and a length of said plastic tubing having an external diameter approximately that of the internal diameter of the said ring member inserted into the said ring member and having the outer walls thereof sealed to the said ring member forming a fluid-tight sealing engagement therewith.

2. A venoclysis apparatus for the administration of parenteral fluids comprising in combination, a body section comprising a flexible resilient plastic chamber member having an end wall adapted for detachably engaging with the discharge outlet of a fluid container, said body section having a lower end section defining a fluid outlet passage adapted to receiving the end of a small diameter flexible plastic tubing, said lower end section having secured therein a plastic ring member the outer walls of which form a fluid-tight engagement with the said section, said ring member being formed of a plastic material which is solvent sealable with the said flexible plastic tubing, and a length of said plastic tubing having an external diameter approximately that of the internal diameter of the said ring member being inserted in the said ring member and having the outer walls thereof sealed to the said ring member forming a fluid-tight engagement therewith.

3. A closure cap member for a parenteral fluid container comprising a body section having an end wall adapted for detachably connecting with the discharge outlet of the said fluid container, said end wall having an air inlet opening and said body section having a fluid outlet passage defined by a lower end section adapted to receive the end of a small diameter flexible plastic tubing, said outlet passage having secured therein a plastic ring member the outer walls of which form a fluid-tight engagement with said body section and being formed of a plastic material which is readily solvent sealable with the surface of a length of flexible tubing, and a length of said plastic tubing having an external diameter approximately that of the internal diameter of the said ring member inserted into said ring member and having the outer walls thereof sealed to said ring member forming a fluid-tight sealing engagement therewith.

References Cited in the file of this patent
UNITED STATES PATENTS
2,716,982    Ryan                Sept. 6, 1955